(12) United States Patent
Müller et al.

(10) Patent No.: US 6,374,663 B1
(45) Date of Patent: Apr. 23, 2002

(54) METHOD AND DEVICE FOR LEAKAGE TESTING IN A TANK SYSTEM

(75) Inventors: Jan Müller, Säve; Peter Ålleving, Alingsås, both of (SE)

(73) Assignee: Volvo Personvagnar AB (SE)

( * ) Notice: Subject to any disclaimer, the term of this patent is extended or adjusted under 35 U.S.C. 154(b) by 0 days.

(21) Appl. No.: 09/404,000

(22) PCT Filed: Apr. 30, 1998

(86) PCT No.: PCT/SE98/00799

§ 371 Date: Jan. 10, 2000

§ 102(e) Date: Jan. 10, 2000

(87) PCT Pub. No.: WO98/49439

PCT Pub. Date: Nov. 5, 1998

(30) Foreign Application Priority Data

Apr. 30, 1997 (SE) ................................................ 9701667

(51) Int. Cl.⁷ .......................... G01M 3/02; G01M 3/26; G01M 15/00
(52) U.S. Cl. ............................ 73/49.2; 73/49.7; 702/50; 702/51; 701/29
(58) Field of Search ................................ 73/49.2, 49.7; 702/50, 51; 701/29

(56) References Cited

U.S. PATENT DOCUMENTS

| | | | |
|---|---|---|---|
| 4,715,214 A | * 12/1987 | Tveter et al. ................. 73/49.2 |
| 4,811,252 A | * 3/1989 | Furuse ........................ 73/49.2 |
| 5,193,512 A | 3/1993 | Steinbrenner et al. |
| 5,195,498 A | 3/1993 | Siebler et al. |
| 5,398,661 A | 3/1995 | Denz et al. |
| 5,425,344 A | 6/1995 | Otsuka et al. |
| 5,442,551 A | 8/1995 | Denz et al. |
| 5,463,998 A | 11/1995 | Denz et al. |
| 5,467,641 A | * 11/1995 | Williams et al. .............. 73/49.7 |
| 5,485,740 A | * 1/1996 | Lippmann et al. ............ 73/1.73 |
| 5,637,788 A | * 6/1997 | Remboski et al. ........ 73/40.5 R |
| 5,765,121 A | * 6/1998 | Schwager et al. ........... 701/104 |
| 5,767,389 A | * 6/1998 | LaFountain ................. 73/49.7 |
| 5,915,270 A | * 6/1999 | Lehmann .................... 73/49.2 |

* cited by examiner

*Primary Examiner*—Hezron Williams
*Assistant Examiner*—Michael Cygan
(74) *Attorney, Agent, or Firm*—Lerner, David, Littenberg, Krumholz & Mentlik, LLP

(57) ABSTRACT

Methods for testing leakage in a tank system are disclosed including sealing the tank system, creating a pressure variation in the sealed tank system, measuring the pressure values in the sealed tank system at predetermined time intervals for a measuring period, and comparing the shape of a curve formed by the measured pressure values to a predetermined curve for the system, whereby if that comparison exceeds a predetermined limit value, the leakage test is disregarded. Apparatus for carrying out such testing is also disclosed.

8 Claims, 4 Drawing Sheets

METHOD AND DEVICE FOR LEAKAGE TESTING IN A TANK SYSTEM

FIELD OF THE INVENTION

The present invention relates to a method for leakage testing in a tank system and a device for carrying out such a method.

BACKGROUND OF THE INVENTION

The requirements for emission control for motor vehicles constantly increase. In connection with such requirements, there are also requirements for detecting that there are no emissions due to leaks in the tank system of the vehicle. If a leak is detected, this is usually indicated to the driver by a control system in the vehicle switching on a light on the instrument panel of the vehicle, a so-called MIL (Malfunction Indication Lamp). An example of a requirement regarding detection of leaks in the tank system of a vehicle is the CARB OBDII Leakage Detection Requirement (California Air Resources Board, On Board Detection) which requires the detection of leaks in a tank system which have a flow which corresponds to the flow through a circular hole, the diameter of which exceeds a certain given limit, which is currently 1 mm.

One method of detecting leaks in the tank system of a vehicle is to seal the tank system during a measuring period, and to create an overpressure or an underpressure in the tank system. If the pressure in the sealed tank system varies more than a certain permitted value during the measuring period, this is taken as an indication of a leak in the tank system. An example of this method is, for example, that shown in U.S. Pat. No. 5,261,379, which uses an underpressure.

A drawback of the method of detecting leaks using pressure variations in a sealed system is that pressure variations can have other causes than leaks. Transient occurrences such as, for example, fuel sloshing can cause pressure increases since sloshing leads to an increased evaporation, and thus to an increased pressure.

This means that during a leakage measurement there can be other circumstances, among them fuel sloshing, due to which the results of the leakage test should not be accepted, since the results of the test are not reliable.

A method or system for leakage testing which cannot recognize circumstances which can cause erroneous measurements can function well in a controlled environment, such as in a test lab where it is possible to check that such conditions are not present. However, under real circumstances, such as under normal driving conditions, such a system will cause erroneous detections of leaks in the tank system.

In conclusion, there is a need to be able to tell when there are circumstances in a tank system, for example fuel sloshing, the presence of which mean that the result of the leakage test should not be accepted.

The object of the present invention is thus to obtain a method which can recognize circumstances, the presence of which means that the result of a leakage test in a tank system should not be accepted.

SUMMARY OF THE INVENTION

In accordance with the present invention, these and other objects have now been realized by the invention of a method for testing leakage in a tank system comprising sealing the tank system, creating a pressure variation in the sealed tank system, measuring the pressure values in the sealed tank system at predetermined time intervals for a predetermined measuring period, and comparing the shape of a first curve formed by the measured pressure values to a predetermined second curve, whereby if the comparison exceeds a predetermined limit value the leakage test is disregarded. In a preferred embodiment, the step of creating the pressure variation in the sealed tank system comprises creating an underpressure in the sealed tank system. In another embodiment, however, the step of creating the pressure variation in the sealed tank system comprises creating an overpressure in the sealed tank system.

In accordance with one embodiment of the method of the present invention, comparing of the shape of the first curve to the predetermined second curve comprises fitting a function with the predetermined second curve to the shape of the first curve using the method of least squares, calculating, squaring and summing the differences between the function of the predetermined second curve and the measured pressure values of the first curve, dividing the sum by the number of the measured pressure values to provide a predetermined ratio, calculating a curving $2a_2$ value for the predetermined second curve, and comparing the predetermined second curve to the first curve using the predetermined ratio and the curving $2a_2$ value. In accordance with another embodiment of the method of the present invention, the predetermined second curve comprises a second degree polynomial.

In accordance with another embodiment of the method of the present invention, the predetermined time intervals are constant. In accordance with one embodiment of the method of the present invention, the predetermined limit value is based upon a condition comprising fuel sloshing.

In accordance with another embodiment of the method of the present invention, the number of the measured pressure values comprises an odd number.

In accordance with present invention, an apparatus has also been devised for testing leakage in a tank system comprising sealing means for sealing the tank system, pressure variation means for exposing the sealed tank system to a predetermined pressure variation, pressure measuring means for measuring the pressure in the sealed tank system, and memory means adapted to store predetermined pressure values for the tank system and for comparing the shape of a first curve formed by the measured pressure values to a predetermined second curve, whereby if the comparison exceeds a predetermined limit value the leakage test is disregarded.

In accordance with one embodiment of the apparatus of the present invention, the pressure variation means comprises means for exposing the sealed tank system to an underpressure.

In accordance with another embodiment of the apparatus of the present invention, the pressure variation means comprises means for exposing the sealed tank system to an overpressure.

According to a preferred embodiment of the present invention, the tank system is first sealed, and subsequently the pressure in the tank system is lowered. Following this, a number of values of the pressure in the tank system are then measured during a measuring period. The curve which is formed by the measured pressure values is then compared to the shape of a pressure variation curve which is known to form during circumstances which allow leakage testing. If the discrepancy between the measured curve and the curve with which it is compared exceeds a certain predefined limit, a circumstance is indicated which means that the result of the leakage testing in the tank system should not be accepted.

BRIEF DESCRIPTION OF THE DRAWINGS

The present invention will be more fully appreciated with reference to the following detailed description, which, in turn, refers to the appended drawings, in which.

DETAILED DESCRIPTION

Figure 1:
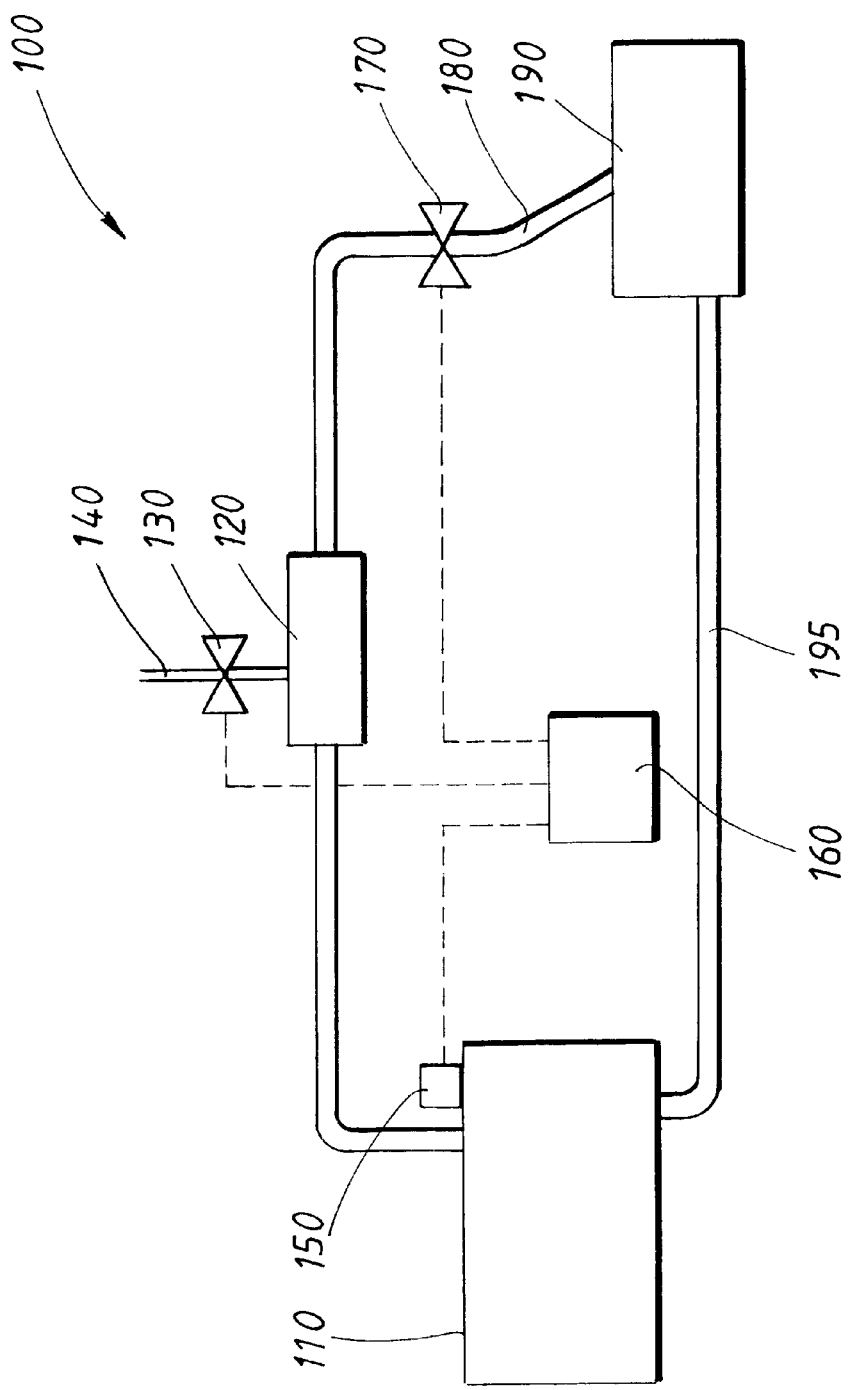
FIG. 1 is a schematic representation of a tank system in which the invention is applied.

FIG. 1 schematically shows a tank system 100 in which the present invention is applied. The tank system comprises a fuel tank 110 which, through a connection 195, provides fuel to the engine system of the vehicle. The tank system 100 further comprises a so-called carbon canister 120. The purpose of the carbon canister 120 is to absorb fuel fumes from the tank system 100. The carbon canister 120 is connected through a valve 130, a so-called Canister Close Valve, CCV, to an exhaust pipe 140. Furthermore, the carbon canister 120 is connected, by means of a pipe 180, to the engine 190 of the vehicle, which enables fuel fumes to be sucked into the engine 190 of the vehicle. The connection between the carbon canister 120 and the engine 190 of the vehicle, the pipe 180, is provided with a valve 170, a so-called Purge Valve, PV, which is opened when fuel fumes are to be led from the carbon canister 120 to the engine 190.

When a leakage test according to the present invention is to be carried out, the system 100 is, in a preferred embodiment, sealed by closing the connection 195. Following this, in the preferred embodiment an underpressure is created in the tank system 100. The underpressure in the tank system 100 is created by leading an underpressure from the engine 190 into the tank system 100 through PV 170 and the pipe 180, following which CCV 130 and PV 170 are closed. The underpressure can also be created in other ways, for example by a separate evacuation pump. A pressure sensor 150 which is preferably arranged at the fuel tank 110 and connected to an engine control unit 160, at predetermined and preferably constant intervals of time $\Delta T$ during a measuring period T provides values ($P_1$–$P_N$) of the pressure in the tank system 100. The measured pressure values ($P_1$–$P_N$) are stored in a memory in the engine control unit 160.

Figure 2:
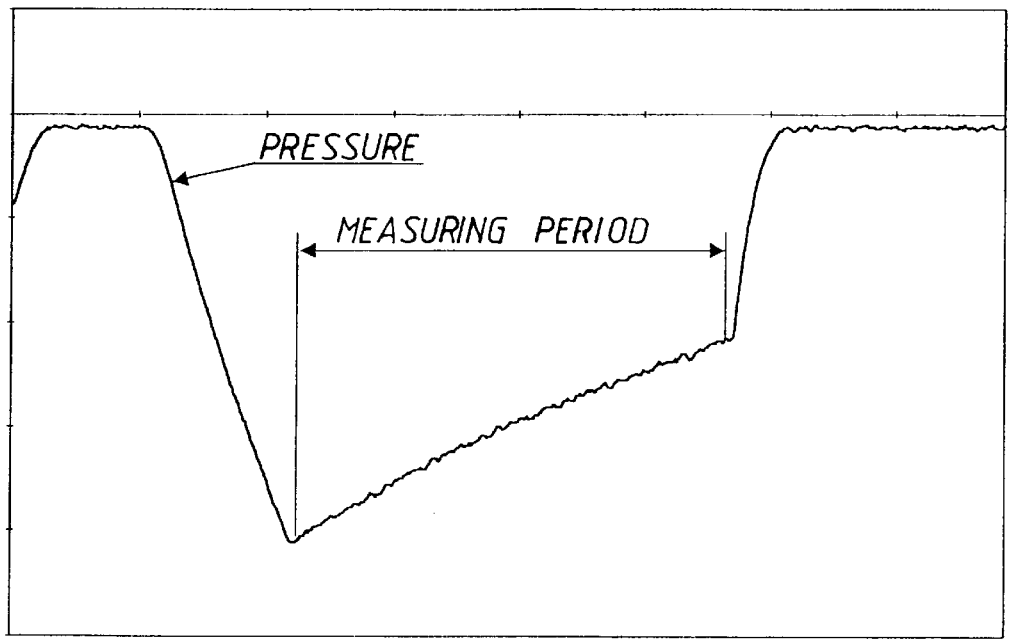
FIG. 2 is a graphical representation of a curve of the pressure development in a sealed tank system in the case of an underpressure, which tank system has a leak with the diameter of about 1 mm.
Figure 3:
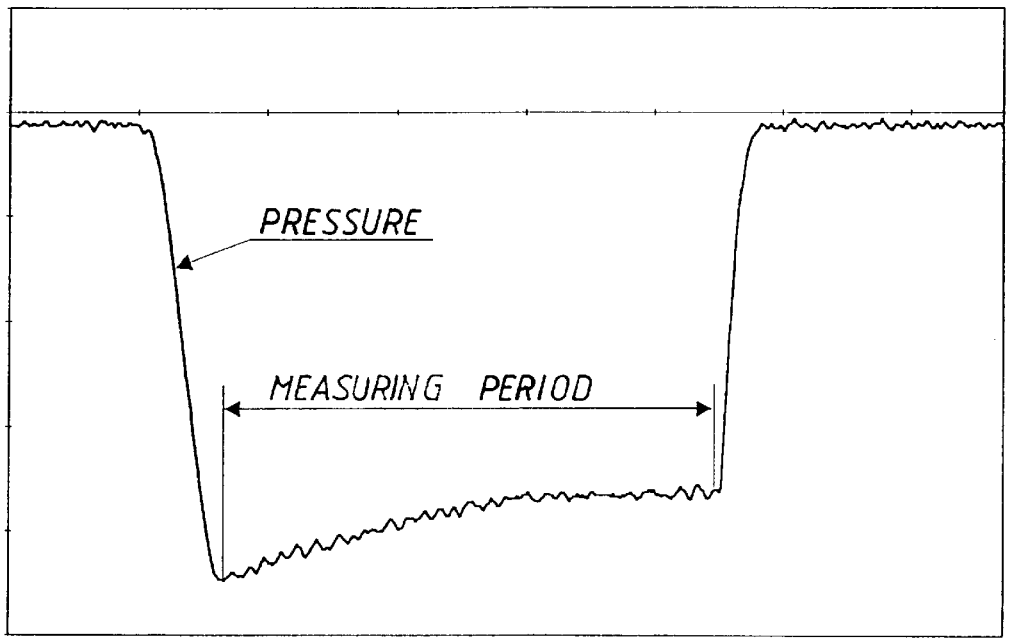
FIG. 3 is a graphical representation of the pressure development in a sealed tank system at underpressure where the tank system does not have any leaks.

Empirically, the curve-shape which is formed by the pressure variation as a function of time in a sealed tank system which is in a state where the result of the leakage test should be accepted is known. Examples of such curves are shown in FIGS. 2 and 3. The curves initially exhibit a drop in pressure, created in the manner described above. When the desired level of the underpressure has been reached, a measuring period is initiated, as indicated in the figures. Following termination of the measuring period, the sealed tank system is again opened, which causes the final pressure increase shown in the figures.

FIG. 2 shows the curve of the pressure variation as a function of time in a sealed tank system 100 with a leak of a diameter of about 1 mm, and FIG. 3 shows the corresponding curve of the pressure variation in a sealed tank system 100 which does not have any leaks. As can be seen, common to these curves is that they are concave and relatively smooth.

Figure 4:
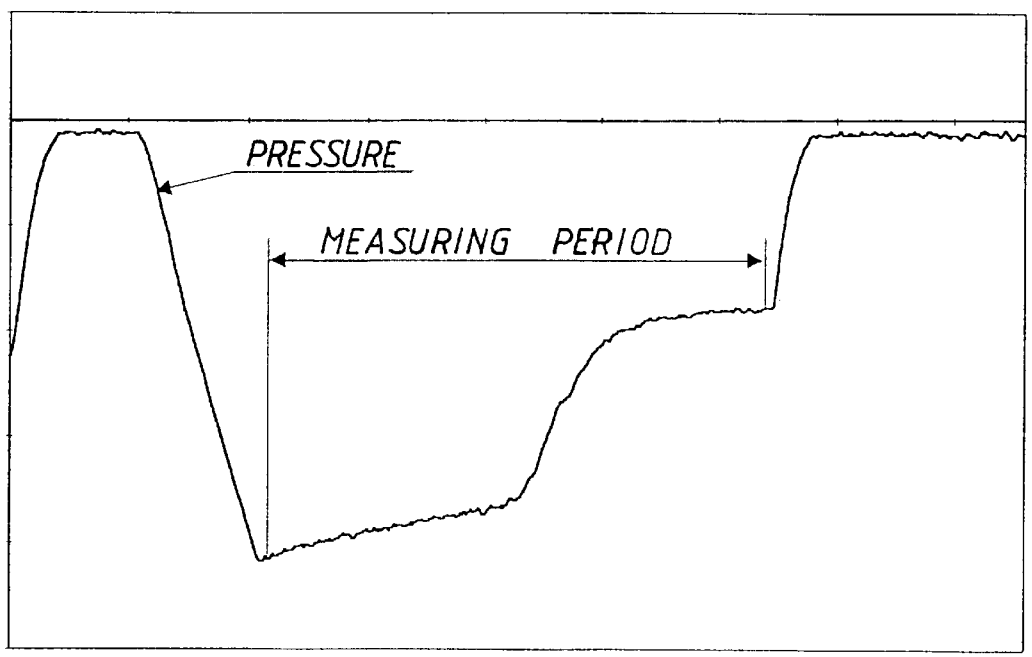
FIG. 4 is a graphical representation of a curve of the pressure development during fuel sloshing in a sealed tank system at an underpressure.

FIG. 4 shows an example of a curve of the pressure development as a function of time during fuel sloshing in a sealed tank system 100 without leaks, at underpressure. The curve of FIG. 4 deviates significantly from the curves which are obtained in the absence of fuel sloshing, a difference which, as can be seen, is present regardless of whether there is a leak in the tank system 100 or not.

As mentioned above, it is known which curve-shape is formed by the pressure variation as a function of time in a sealed tank system which is in a state where the result of the leakage test should be accepted. Due to this knowledge, if the measured pressure values ($P_1$–$P_N$) are used to form a curve K, it is then possible to determine, using the curve K, whether the result of the leakage test should be accepted or not.

To be more precise, this is done by letting the engine control unit 160 fit a predefined curve-shape to the curve K. The final form of the predefined curve-shape is defined by the fitting. In the preferred embodiment, the predefined curve-shape is a polynomial of the second order. Following the fitting, a sum S of the squares of the differences between the curve K and the polynomial in the points $P_1$–$P_N$ is calculated. A measurement of the curving $2a_2$ is obtained from the polynomial. These calculations can be carried out in the following manner:

Let $y_1, y_2, \ldots Y_N$ be a number of measured values and let $X_1, X_2, \ldots X_N$ be the periods in time at which they were measured.

Additionally let y be an arbitrary second degree polynomial, $y=f(x)=a_0+a_1 x+a_2 x^2$ A curve fitting using the method of smallest squares of $y=f(x)$ to the curve defined by $(X_n, Y_n)$ where $n=1, 2, \ldots N$, can be obtained from the linear system (1).

$$a_0 \sum_{k=1}^{N} x_k^i + a_1 \sum_{k=1}^{N} x_k^{1+i} + a_2 \sum_{k=1}^{N} x_k^{2+i} = \sum_{k=1}^{N} x_k^i y_k \quad i = 0, 1, 2 \tag{1}$$

Make the following substitutions $$b_0 = \sum_{k=1}^{N} x_k^0 = N \tag{2a}$$

$$b_1 = \sum_{k=1}^{N} x_k^1 = x_1 + x_2 + \ldots + x_N \tag{2b}$$

$$b_2 = \sum_{k=1}^{N} x_k^2 = x_1^2 + x_2^2 + \ldots + x_N^2 \tag{2c}$$

$$b_3 = \sum_{k=1}^{N} x_k^3 = x_1^3 + x_2^3 + \ldots + x_N^3 \tag{2d}$$

$$b_4 = \sum_{k=1}^{N} x_k^4 = x_1^4 + x_2^4 + \ldots + x_N^4 \tag{2e}$$

$$c_1 = \sum_{k=1}^{N} x_k^0 y_k = y_1 + y_2 + \ldots + y_N \tag{2f}$$

$$c_2 = \sum_{k=1}^{N} x_k^1 y_k = x_1 y_1 + x_2 y_2 + \ldots + x_N y_N \quad (2g)$$

$$c_3 = \sum_{k=1}^{N} x_k^2 y_k = x_1^2 y_1 + x_2^2 y_2 + \ldots + x_N^2 y_N \quad (2h)$$

(1) can then be rewritten as $a_0 b_0 + a_1 b_1 + a_2 b_2 = c_1$ $a_0 b_1 + a_1 b_2 + a_2 b_3 = c_2$ $a_0 b_2 + a_1 b_3 + a_2 b_4 = c_3$ \quad (3)

If $x_1, x_2, \ldots x_N$ are symmetrically chosen around zero, in other words $x_1 = -x_N, x_2 = -x_{N-1}, \ldots$ \quad (4)

this means that $b_1 = b_3 = 0$ and (3) can be rewritten as $a_0 b_0 + a_2 b_2 = c_1$ $a_1 b_2 = c_2$ $a_0 b_2 + a_2 b_4 = c_3$ \quad (5)

which can be solved in a simple manner $$\begin{cases} a_0 = \dfrac{c_1 b_4 - c_3 b_2}{b_0 b_4 - b_2^2} \\ a_1 = \dfrac{c_2}{b_2} \\ a_2 = \dfrac{c_1 b_2 - c_3 b_0}{b_2^2 - b_0 b_4} \end{cases} \quad (6)$$

A sum of smallest squares S can be calculated as $$S = (f(x_1) - y_1)^2 + (f(x_2) - y_2)^2 + \ldots + (f(x_N) - y_N)^2 \quad (7)$$

The value S is a measurement of how well the fitted curve $y = f(x)$ follows the curve which is defined by the values in the measurement series $(X_n, Y_n)$, $n = 1, 2 \ldots, N$. If N is varied between the different measuring series, S/N can be used instead. This enables different measuring series to be compared to each other.

The second derivative of $f(x)$ is $2a_2$.

The curving of $f(x)$ is $*f''(x)* = *2a_2*$.

If $f''(x) = a_2 > 0$ the curve is convex.

If $f''(x) = a_2 < 0$ the curve is concave.

Figure 5:
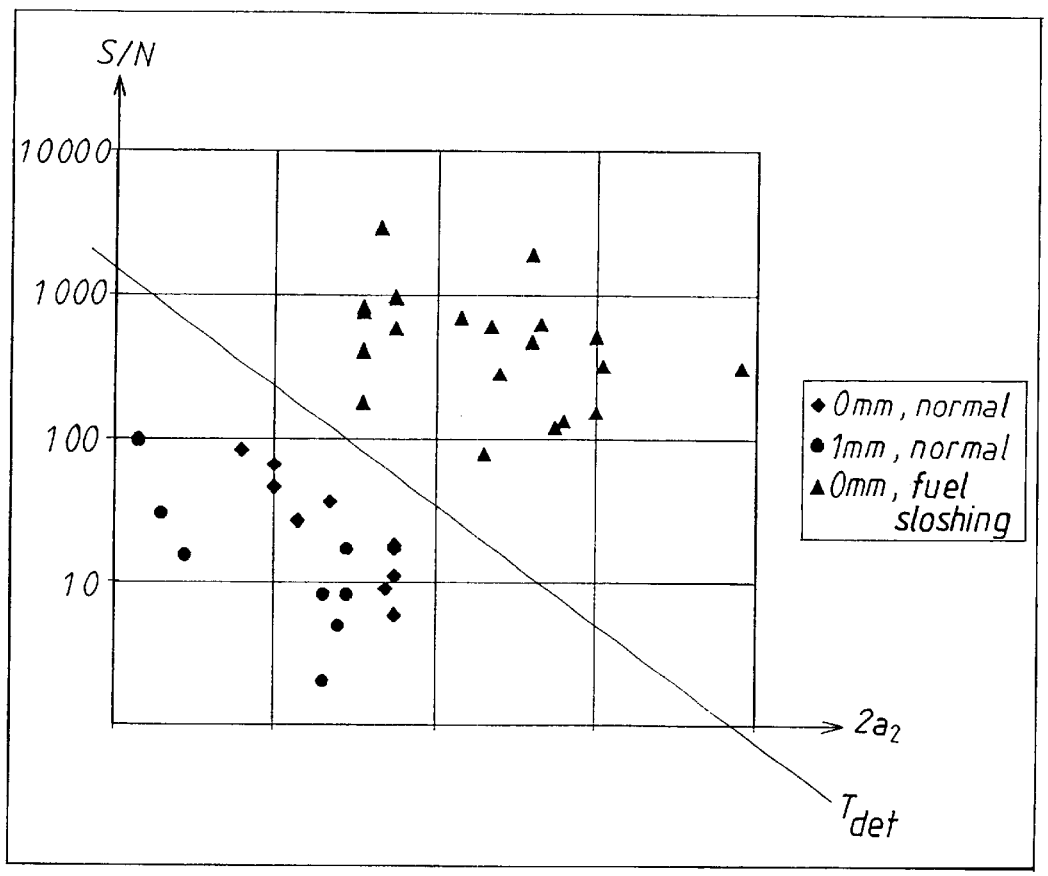
FIG. 5 is a graphical representation of the least square sum (S/N) and the curving ($2a_2$) for a number of leakage tests.

The results of this method applied to real leakage tests with systems with and without leaks, without fuel sloshing and a system without leaks with fuel sloshing, are shown (in a logarithmic scale) in FIG. 5. As can be seen from FIG. 5, there is a clear difference between systems with and without fuel sloshing. By determining a suitable threshold level, it is thus possible to detect the presence of fuel sloshing, and thus also to determine when the result of the leakage test should not be accepted.

An example of a threshold level is shown by the line $T_{DET}$ of FIG. 5.

The present invention is not limited to the described embodiments, but can be varied within the scope of the appended claims. For example, the pressure which is created in the sealed tank system 100 can be an overpressure instead of an underpressure.

The comparison between the curve K and another curve can of course be carried out in a number of ways apart from that shown above. In the example described, the comparison is made when all the measurements ($P_1 - P_N$) have been made. In an alternative embodiment, the comparison can be made during the measuring period.

Furthermore, there can be other curve-shapes besides second degree polynomials with which it is suitable to compare. The interval of time $\Delta T$ between the pressure measurements does not need to be constant, and the circumstance which does not allow leakage testing does not of course need to be fuel sloshing, but can be an arbitrary transient occurrence.

The components used in the device and the method, the pressure sensor 150 and the engine control unit 160 can be of a large number of types. Since the choice of these separate components is not of essential importance to the present invention, they have not been described above. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method for on-board evaluation of leakage testing conditions in a tank system in a motor vehicle, comprising sealing said tank system, creating a pressure variation in said sealed tank system, measuring the pressure values in said sealed tank system at predetermined time intervals for a predetermined measuring period, and comparing the shape of a first curve formed by said measured pressure values to a predetermined second curve shape, said second curve shape being characteristic for a sealed tank system having fuel sloshing, whereby if said comparison exceeds a predetermined limit value said leakage test is disregarded.

2. The method of claim 1 wherein said creating of said pressure variation in said sealed tank system comprises creating an underpressure in said sealed tank system.

3. The method of claim 1 wherein said creating of said pressure variation in said sealed tank system comprises creating an overpressure in said sealed tank system.

4. The method of claim 1 wherein said predetermined second curve comprises a second degree polynomial.

5. The method of claim 1 wherein said predetermined time intervals are constant.

6. The method of claim 1 wherein said predetermined limit value is based upon a condition comprising fuel sloshing.

7. The method of claim 1 wherein the number of said measured pressure values comprises an odd number.

8. A method for on-board evaluation of leakage testing conditions in a tank system in a motor vehicle, comprising sealing said tank system, creating a pressure variation in said sealed tank system, measuring the pressure values in said sealed tank system at predetermined time intervals for a predetermined measuring period, and comparing the shape of a first curve formed by said measured pressure values to a predetermined second curve shape, said second curve shape being characteristic for a sealed tank system having fuel sloshing, whereby if said comparison exceeds a predetermined limit value said leakage test is disregarded, wherein said comparing of said shape of said first curve to said predetermined second curve comprises fitting a function with said predetermined second curve to said shape of said first curve using the method of least squares, calculating, squaring and summing the differences between said function of said predetermined second curve and said measured pressure values of said first curve, dividing said sum by the number of said measured pressure values to provide a predetermined ratio, calculating a curving $2a_2$ value for said predetermined second curve, and comparing said predetermined second curve to said first curve using said predetermined ratio and said curving $2a_2$ value.

* * * * *

UNITED STATES PATENT AND TRADEMARK OFFICE
CERTIFICATE OF CORRECTION

PATENT NO.    : 6,374,663 B1
DATED         : April 23, 2002
INVENTOR(S)   : Jan Muller and Peter Alleving It is certified that error appears in the above-identified patent and that said Letters Patent is hereby corrected as shown below:

Column 2,
Lines 24 and 29, please start new paragraph with -- In --.

Column 4,
Line 32, "$y_1, y_2,...Y_N$" should be -- $y_1, y_2,...y_N$ --.
Line 39, "$(X_n, Y_n)$" should be -- $(x_n, y_n)$ --.
Line 40, replace the equation with the following equation:

$$-- a_0 \sum_{k=1}^{N} x_k^i + a_1 \sum_{k=1}^{N} x_k^{1+i} + a_2 \sum_{k=1}^{N} x_k^{2+i} = \sum_{k=1}^{N} x_k^i y_k \quad i = 0,1,2 \quad (1) \quad --$$

Line 48, replace the equations with the following equations:

$$-- b_0 = \sum_{k=1}^{N} x_k^0 = N \quad (2a)$$

$$b_1 = \sum_{k=1}^{N} x_k^1 = x_1 + x_2 + ... + x_N \quad (2b)$$

$$b_2 = \sum_{k=1}^{N} x_k^2 = x_1^2 + x_2^2 + ... + x_N^2 \quad (2c)$$

$$b_3 = \sum_{k=1}^{N} x_k^3 = x_1^3 + x_2^3 + ... + x_N^3 \quad (2d)$$

$$b_4 = \sum_{k=1}^{N} x_k^4 = x_1^4 + x_2^4 + ... + x_N^4 \quad (2e)$$

$$c_1 = \sum_{k=1}^{N} x_k^0 y_k = y_1 + y_2 + ... + y_N \quad (2f)$$

$$c_2 = \sum_{k=1}^{N} x_k^1 y_k = x_1 y_1 + x_2 y_2 + ... + x_N y_N \quad (2g)$$

$$c_3 = \sum_{k=1}^{N} x_k^2 y_k = x_1^2 y_1 + x_2^2 y_2 + ... + x_N^2 y_N \quad (2h) \quad --$$

UNITED STATES PATENT AND TRADEMARK OFFICE
CERTIFICATE OF CORRECTION

PATENT NO. : 6,374,663 B1
DATED : April 23, 2002
INVENTOR(S) : Jan Muller and Peter Alleving It is certified that error appears in the above-identified patent and that said Letters Patent is hereby corrected as shown below:

Column 5,
Line 30, replace the equation with the following equation:

$$-- \begin{cases} a_0 = \dfrac{c_1 b_4 - c_3 b_2}{b_0 b_4 - b_2^2} \\ a_1 = \dfrac{c_2}{b_2} \\ a_2 = \dfrac{c_1 b_2 - c_3 b_0}{b_2^2 - b_0 b_4} \end{cases} \quad (6) --$$

Signed and Sealed this

Fifth Day of November, 2002

*Attest:*

*Attesting Officer*

JAMES E. ROGAN
*Director of the United States Patent and Trademark Office*